United States Patent [19]

McGuire

[11] Patent Number: 4,897,956
[45] Date of Patent: Feb. 6, 1990

[54] TREE BRACING APPARATUS

[76] Inventor: Robert M. McGuire, Rte. 1, Box 123B, Stacy, Minn. 55079

[21] Appl. No.: 103,844

[22] Filed: Oct. 1, 1987

[51] Int. Cl.⁴ .............................................. A01G 17/04
[52] U.S. Cl. ......................................... 47/43; 52/148
[58] Field of Search .............. 47/42, 43, 44; 24/16 R, 24/16 PB, 30.5 P, 115 K; 52/148

[56] References Cited

U.S. PATENT DOCUMENTS

| | | | |
|---|---|---|---|
| 799,999 | 9/1905 | Massard | 47/43 |
| 856,099 | 6/1907 | Peirce, Jr. | 47/42 |
| 3,224,054 | 12/1965 | Lige | 24/16 PB |
| 3,365,753 | 1/1968 | Prenner et al. | 24/16 PB |
| 3,438,095 | 4/1969 | Evans | 24/16 PB |
| 4,073,090 | 2/1978 | Lucia | 47/43 |
| 4,223,424 | 9/1980 | Burnett | 24/16 PB |
| 4,249,342 | 2/1981 | Williams | 47/43 |
| 4,318,246 | 3/1982 | Jungbluth et al. | 47/42 |
| 4,319,428 | 3/1982 | Fox | 47/42 |
| 4,576,664 | 3/1986 | Delahunty | 47/44 |

FOREIGN PATENT DOCUMENTS

| | | | |
|---|---|---|---|
| 753420 | 10/1951 | Fed. Rep. of Germany | 47/47 |
| 864348 | 4/1961 | United Kingdom | 47/44 |
| 1048803 | 11/1966 | United Kingdom | 47/43 |
| 1404327 | 8/1975 | United Kingdom | 47/47 |

Primary Examiner—Harold J. Tudor
Assistant Examiner—Richard W. Wendtland
Attorney, Agent, or Firm—Merchant, Gould, Smith, Edell, Welter & Schmidt

[57] ABSTRACT

A three point tree bracing collar is formed of a planar, elongate plastic material including a slot near one end through which the other end is passed in order to wrap the collar around a tree to be braced. The other end includes a reinforced eyelet for attaching an anchoring line with the other anchoring lines being disposed around the outside of the collar. A two point tree bracing collar includes first and second ends and a slot in said collar intermediate said ends through which one of said ends is passed in order to wrap the collar around a tree. Each end includes an eyelet for attaching an anchoring line thereto. Both embodiments include notches along the extent to the end to be passed through the slot so that the collar holds itself in place when it is initially positioned on the tree.

8 Claims, 2 Drawing Sheets

FIG. 1
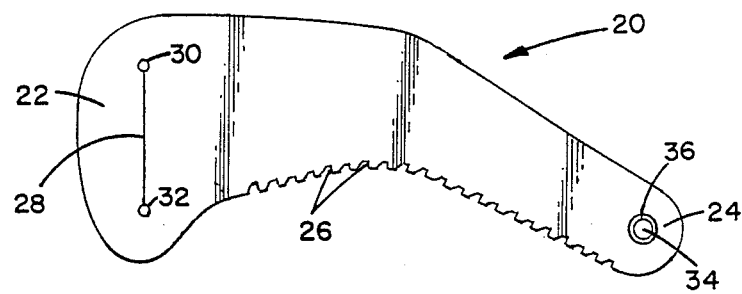
FIG. 3
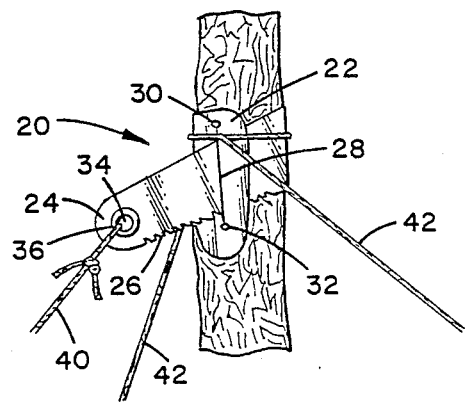
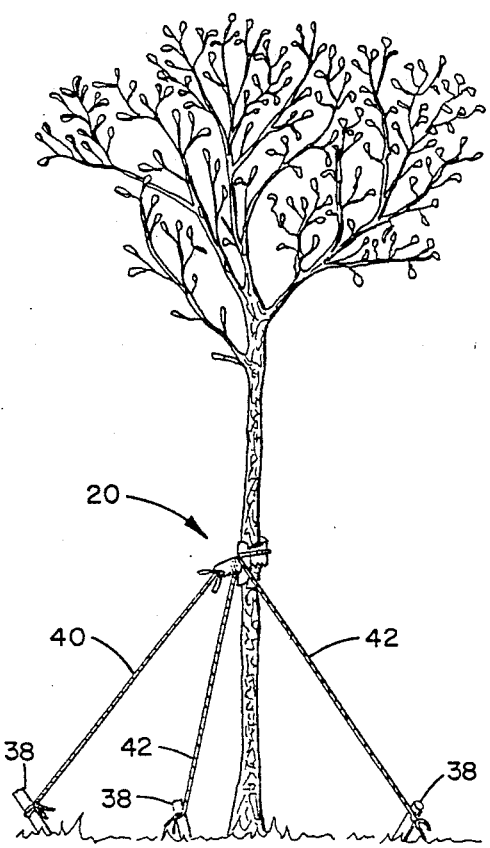
FIG. 2

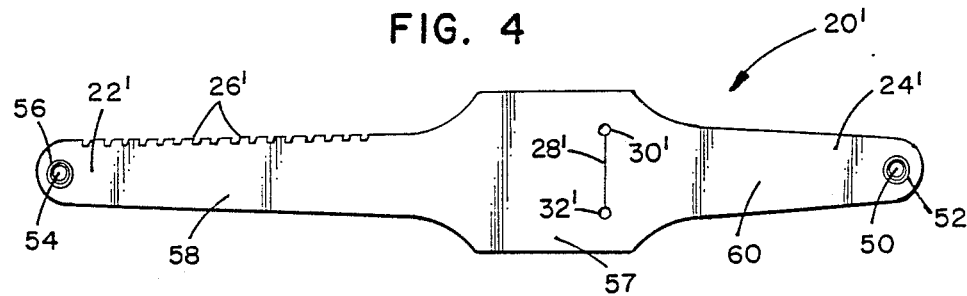
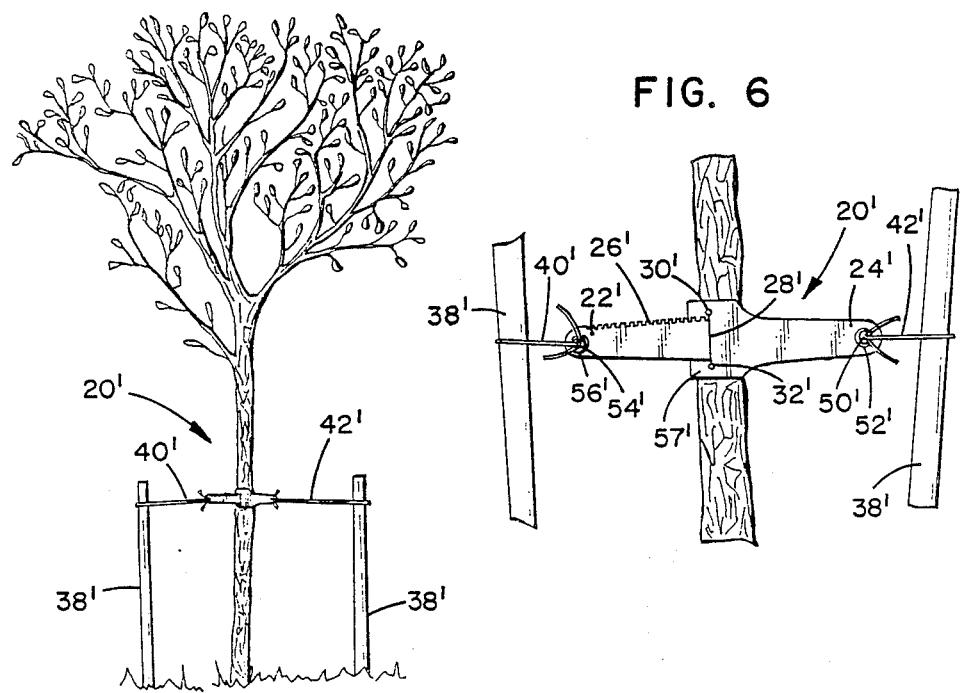

TREE BRACING APPARATUS

TECHNICAL FIELD OF THE INVENTION

The present invention pertains generally to tree husbandry, and more particularly to apparatus for bracing newly transplanted trees.

BACKGROUND OF THE INVENTION

A newly transplanted tree must be braced in order to allow the root system time to develop and sufficiently anchor the tree so that it does not tilt or fall under its own weight or as the result of wind. The conventional method of bracing newly transplanted trees is to use one or more rope or wire lines to brace the tree to two or three stakes in the ground near the tree. The lines are usually fastened to the tree trunk at least halfway up the trunk so that the lines have enough leverage on the trunk to maintain its stability in high winds.

It is well known that bracing lines have a tendency to saw or cut into the tree trunk as the tree sways in the wind causing girdling and/or trunk damage thus disfiguring the tree trunk and/or exposing the tree to the infiltration of insects or disease. Accordingly, garden hose is often used around the lines along their length where they engage the tree trunk directly to shield the trunk form the knifing action of the lines and to disperse the force of the engaging lines over a wider area of the trunk to avoid girdling. Nonetheless, because the hose tends to be made of relative flexible material the engaging force of the line or lines is still focused over a relatively small area of the hose and trunk underneath such that the hose also tends to saw into the tree trunk, although to a lesser degree than uncovered lines. Moreover, it is usually necessary to use some uncovered line to secure and tighten the covered line around the trunk at the desired height so that it does not slip down, particularly in the three point system in which the lines pull downwardly. If not properly fastened over and around the hose covered lines or if displaced these uncovered lines can engage and damage the trunk.

Aside from their tendency to girdle a tree trunk, conventional tree bracing techniques can be difficult to tighten into place, particularly for persons working alone, due to the difficulty in keeping the line synched around the trunk at its desired position while the ends of the lines are anchored to the stakes.

Accordingly, there is a need for a tree bracing system which avoids girdling and/or damage to the tree trunk and which is easy and efficient to implement.

SUMMARY OF THE INVENTION

According to the preferred embodiment of the present invention there is provided a three point tree bracing collar for bracing a tree, with the collar formed of a substantially planar, elongate plastic material and having first and second ends with the second end including a slot through which the first end can be passed in order to wrap the collar around a tree trunk. The first end includes means for attaching a first anchoring line thereto. The collar provides a surface against and around which one or more other anchoring lines may be fastened when the collar is wrapped around the trunk whereby the first and one or more other anchoring lines can be anchored to the ground to provide three point bracing. Further, the length of the collar engaging the tree trunk when it is wrapped therearound has a width and rigidity sufficient to disperse the bracing forces of the anchoring line attached to the first end and the one or more other lines wrapped over the collar over an area of the tree trunk sufficient to avoid sawing of the collar into the tree trunk and girdling of the tree trunk.

According to another aspect of the invention the collar includes a curve relative to its longitudinal axis so that the first end extends downwardly when the collar is wrapped around the tree trunk. According to yet another aspect of the invention, the first end includes teeth means along an edge thereof for detaining it in position in the slot when the collar is wrapped around the trunk. Thus, the collar is self fastening so that it holds its position on the tree trunk while the anchoring lines are anchored to the stakes. According to yet another aspect of the invention the collar material is high density polyethelene, and the collar is one or more inches in width along the length engaging the tree trunk.

An alternate embodiment of the present invention provides a tree bracing collar comprising a substantially planar, elongate plastic material having first and second ends each including means for attached an anchoring line thereto and having a portion between the ends including a slot through which one of the ends may be inserted to wrap the collar around the trunk of the tree to be braced. The length of the collar engaging the tree trunk when it is fastened in place therearound has a width and rigidity sufficient to disperse the bracing forces of the anchoring lines attached to the ends over an area of the tree trunk sufficient to avoid sawing of the collar into the tree trunk and girdling of the tree trunk.

BRIEF DESCRIPTION OF THE DRAWINGS

In the drawing, in which like reference numerals indicate corresponding parts throughout the several views;

FIG. 1 is a cross-sectional view of an embodiment of a tree bracing apparatus in accordance with the principles of the present invention;

FIG. 2 is a perspective view of the embodiment shown in FIG. 1, illustrating the apparatus as installed on a tree trunk and stakes;

FIG. 3 is a close-up perspective view of the embodiment shown in FIGS. 1 and 2.

FIG. 4 is a cross-sectional view of another embodiment of a tree-bracing apparatus in accordance with the principles of the present invention;

FIG. 5 is a perspective view of the embodiment shown in FIG. 4 illustrating the apparatus as installed on a tree trunk and stakes;

FIG. 6 is a close-up perspective view of the embodiment shown in FIGS. 4 and 5.

DETAILED DESCRIPTION OF THE INVENTION

In the following detailed description of the preferred embodiments, references is made to accompanying drawings which form a part hereof, and in which is shown by way of illustration specific embodiments in which the invention may be practiced. These embodiments are described in sufficient detail to enable those skilled in the art to practice the invention and it is to be understood that other embodiments may be utilized and that structural changes may be made without departing from the scope of the present invention. The following detailed description is, therefore, not to be taken in a limiting sense, and the scope of the present invention is defined by the appended claims.

Referring now to the drawing, there is illustrated in FIGS. 1 through 3 an embodiment of a tree bracing collar 20 in accordance with the principles of the present invention. As shown in FIGS. 2 and 3, the bracing collar 20 is used in connection with anchoring lines to brace a newly planted tree. The tree collar 20 is of substantially flat construction, approximately 30 mils thick and is formed of a high density polyethelene plastic, thus rendering it flexible in nature but yet relatively rigid. As illustrated in FIG. 1, this embodiment of the bracing collar is of partial boomerang shape, having a relative wide first end 22 and a narrower second end 24. Wrap 20 includes a bend or curve so that it is generally accurate in along its longitudinal axis, and is about 5" in width at its widest point near its wider end and about 2" in width at its narrow end.

A slit or slot 28 is included in the first end 22 and holes 30 and 32 are provided at its ends. On the narrow end thereof the bracing collar includes an eyelet 34 reinforced with a crimped-on metal ring 36. Bracing collar 20 further includes a plurality of teeth 26 cut into its "lower" edge on its "inside" perimeter.

In use, the first end 22 of the bracing collar is placed through the slit 28 and pulled until it encircles the trunk of a tree to be braced so that the eyelet 34 is pointing outwardly and downwardly as illustrated in FIGS. 2 and 3. Notches 26 engage the "lower" end of slit 28 to prevent the collar from slipping back while the bracing lines are secured. Preferably three stakes 38 are partially driven into the ground prior to engaging the collar about the tree. The stakes are preferably spaced evenly around the circumference of the tree at a distance of about four feet from the trunk of the tree. A line or rope 40 is tied to the eyelet 34 and the other end fastened to one of the stakes 38, independently of the other two stakes. A further rope 42 is then tied to a second stake and its length is wrapped about the tree collar as is best illustrated in FIG. 3. Rope 42 is then tied to the third stake and excess rope on both pieces 40 and 42 removed if need be. To tighten the ropes 40 and 42 and thus effectively brace the tree, the stakes 38 are driven further into the ground. Thus, the bracing lines do not touch the bark of the tree but rather only engage the bracing collar. Because the collar material is relatively rigid, the engaging forces of the lines are spread over a wider area than in the case of the rubber hose shields of the prior art. In this manner damage to the tree caused by the cutting or sawing of the force of the bracing lines into the tree trunk is avoided. It will also be appreciated that the collar tends to "grab" the tree trunk to maintain its vertical position.

Illustrated in FIGS. 4, 5, and 6 is an alternate embodiment of the bracing collar of the present invention, in which corresponding parts to elements of the preferred embodiment are depicted with the same reference numerals, except that reference numerals of the alternate embodiment are primed. The alternate embodiment is of substantially flat (30 mil thick) construction and is formed of the same high density polyethelene plastic as the preferred embodiment, but has a wide body portion 57, about 3½" in width, flanked by two narrower portions 58 and 60 each about 1 ½" to 2" in width from their wider to narrow portions. The first portion 58 terminates in the first end 22' and the second portion 60 terminates in the second end 24'. The first portion 58 is longer than the second portion 60, and the second portion 60 has disposed along one edge of its construction notches 26' like those of the preferred embodiment.

A transverse slit or slot 28' with holes 30' and 32' disposed at its upper and lower ends respectively is defined in the body portion 57 proximate the second portion 60. As in the preferred embodiment, holes 30' and 32' are substantially circular. The alternate embodiment of the bracing collar 20' has defined in its first and second holes 50 and 54 disposed proximate first and second ends 22' and 24' respectively. Each hole is reinforced with a metal eyelet ring 52 and 56, respectively.

In use, the first end 22' of the alternate embodiment is placed through the slit 28' and pulled until the tree bracing apparatus 20' encircles the trunk of a tree to be braced, in a substantially horizontal position, as illustrated in FIGS. 5 and 6. Notches 26' provide a mechanism like that of the preferred embodiment by which the end 26' will not slip back once the collar is disposed about the circumference of the tree trunk. Preferably, stakes 38' are driven into the ground on either side of the tree, about 18 inches from the trunk before the collar is engaged around the trunk. Ropes 40' and 42' are tied to the ends of the bracing collar 20' through eyelets 50 and 54. One rope (either 40' or 42') is tied to a stake, then the collar is tightened further and the remaining rope tied to the other stake.

As indicated, the three point bracing system of the preferred embodiment tends to be preferred because of the additional strength and stability of a three point bracing as opposed to the two point bracing of the alternate embodiment. The alternate embodiment, however, would be preferable for use where three point anchoring is not possible, for instance on a boulevard where the street, sidewalk or driveway prevents three point placement of stakes. The alternate embodiment is also preferred for use in public areas such as parks where the ropes and stakes of the three point system are undesirably hazardous to those walking or running near the braced tree.

As may be readily appreciated, both embodiments of the present invention are advantageous over the prior art method of bracing trees by the use of wires, ropes and hoses. For one, the bracing collars of the present invention may be readily positioned on a tree in a single, simple step, and stay self engaged until the bracing ropes have been attached and anchored. This is in contrast with the less convenient prior art techniques in which the bracing ropes or lines themselves must be used to hold the tree collaping portion to the tree while the lines are secured to the stakes. More importantly, the bracing collars of the present invention substantially avoid the girdling and trunk damage problems that have been long present in prior art techniques which tend to focus the bracing forces over a relatively small surface area of the tree defined by the width of the bracing lines and/or hose covered lines. Accordingly, the present invention provides a system for anchoring trees which is easy to fasten into place and which protects the tree from damage and disfigurement.

While the present invention has been described in connection with the preferred embodiment thereof, it will be understood that many modifications will be readily apparent to those of ordinary skill in the art, and this application is intended to cover any adaptions or variations thereof. Therefore, it is manifestly intended that this invention be limited only by the claims and the equivalents thereof.

I claim:

1. A three point tree bracing collar for bracing a tree, said collar formed of substantially planar, elongate plastic material and having first and second ends with said second end including a slot through which said first end can be passed in order to wrap the collar around a tree trunk, said first end including means for attaching a first anchoring line thereto, said collar providing a surface against and around which one or more other anchoring lines may be fastened when the collar is wrapped around said trunk whereby said first and one or more other anchoring lines can be anchored to the ground to provide three point bracing, said collar curved relative to its longitudinal axis so that said first end extends downwardly when said collar is wrapped around said trunk, the length of said collar engaging the tree trunk when it is wrapped therearound having a width and rigidity sufficient to disperse the bracing forces of the anchoring line attached to said first end and the one or more other lines wrapped over said collar over an area of the tree trunk sufficient to avoid sawing of the collar into the tree trunk and girdling of the tree trunk.

2. The apparatus according to claim 1 wherein said plastic material is high density polyethelene and is approximately 30 mil thick.

3. The apparatus according to claim 1 wherein said collar is one or more inches in width along said length engaging the tree trunk.

4. The apparatus according to claim 1, 2 or 3 wherein said one end includes teeth means for engaging an edge of said slot and detaining said end in position when the collar is wrapped around said trunk.

5. A three point tree bracing system for bracing a tree comprising:
   a substantially planar, elongate plastic collar wrapped around the trunk of the tree to be braced, said collar having first and second ends with said second end including a slot through which said first end passes, said first end including means for attaching a first anchoring line thereto, said collar curved relative to its longitudinal axis so that said first end extends downwardly when said collar is wrapped around said trunk; and
   one or more other anchoring line fastened to the tree trunk around and over said collar whereby said first and other anchoring lines can be anchored to the ground to provide three point bracing, the length of said collar engaging the tree trunk when it is fastened in place therearound having a width and rigidity sufficient to disperse the bracing forces of the anchoring line attached to said first end and the other lines wrapped over said collar over an area of the tree trunk sufficient to avoid sawing of the collar into the tree trunk and girdling of the tree trunk.

6. The apparatus according to claim 5 wherein said plastic material is high density polyethelene and is approximately 30 mils thick.

7. The apparatus according to claim 5 wherein said collar is one or more inches in width along said length engaging the tree trunk.

8. The apparatus according to claim 5, 6 or 7 wherein said one end includes teeth means for engaging an edge of said slot and detaining said end in position when the collar is wrapped around said trunk.

* * * * *